(12) United States Patent  (10) Patent No.: US 6,768,595 B2
Nagahara  (45) Date of Patent: Jul. 27, 2004

(54) FIVE-GROUP ZOOM LENS AND PROJECTION DISPLAY DEVICE INCLUDING IT

(75) Inventor: Akiko Nagahara, Koshigaya (JP)

(73) Assignee: Fuji Photo Optical Co., Ltd., Saitama City (JP)

(*) Notice: Subject to any disclaimer, the term of this patent is extended or adjusted under 35 U.S.C. 154(b) by 0 days.

(21) Appl. No.: 10/395,093

(22) Filed: Mar. 25, 2003

(65) Prior Publication Data
US 2003/0184874 A1 Oct. 2, 2003

(30) Foreign Application Priority Data
Mar. 29, 2002 (JP) ........................................ 2002-096336

(51) Int. Cl.⁷ .............................................. G02B 15/14
(52) U.S. Cl. ........................................ 359/683; 359/680
(58) Field of Search .......................... 359/683, 680–682

(56) References Cited

U.S. PATENT DOCUMENTS

| 6,008,952 A | 12/1999 | Yamamoto | 359/683 |
| 6,137,638 A * | 10/2000 | Yamagishi et al. | 359/682 |
| 6,222,680 B1 | 4/2001 | Yamamoto et al. | 359/680 |
| 6,480,340 B1 | 11/2002 | Yamamoto | 359/676 |
| 2003/0103266 A1 * | 6/2003 | Wada | 359/649 |

* cited by examiner

Primary Examiner—Scott J. Sugarman
Assistant Examiner—Deborah Raizen
(74) Attorney, Agent, or Firm—Arnold International; Jon W. Henry; Bruce Y. Arnold

(57) ABSTRACT

A five-group zoom lens is formed of, in order from the enlarging side of the zoom lens, a negative first lens group that is movable for focusing and that is stationary during zooming, a positive second lens group, a positive third lens group, a negative fourth lens group, and a positive fifth lens group that is stationary during zooming. The second lens group, the third lens group, and the fourth lens group move relative to one another and relative to the first and fifth lens groups during zooming. The second lens group includes a negative lens component that has a concave lens surface on the reducing side of the zoom lens. The zoom lens satisfies various conditions and may be used in a projection display device or an image pickup device such as a camera.

20 Claims, 5 Drawing Sheets

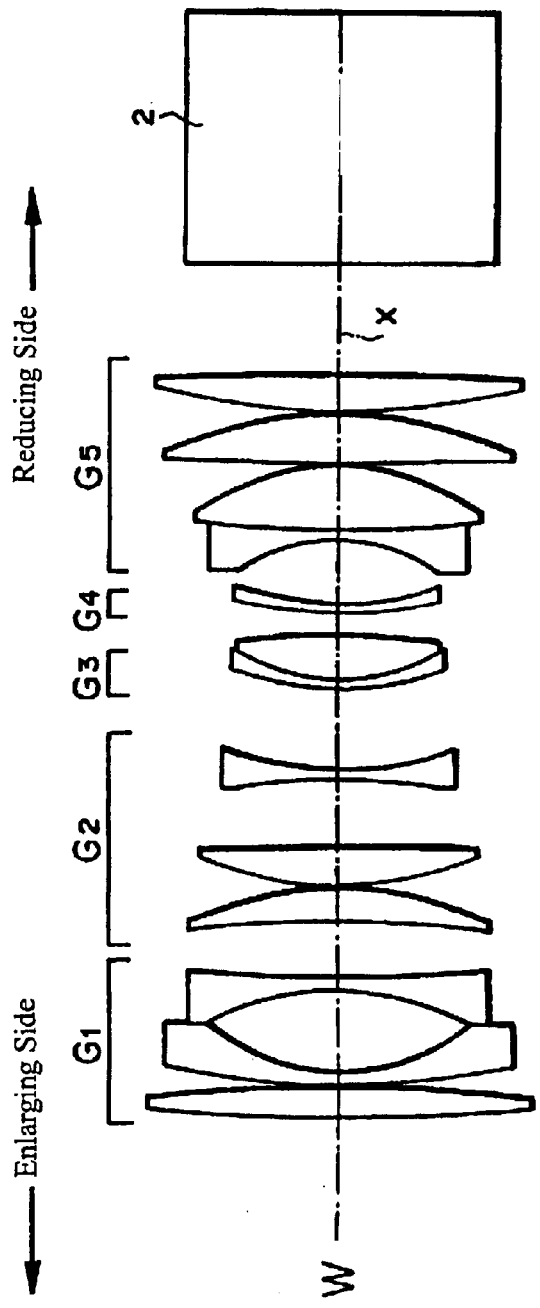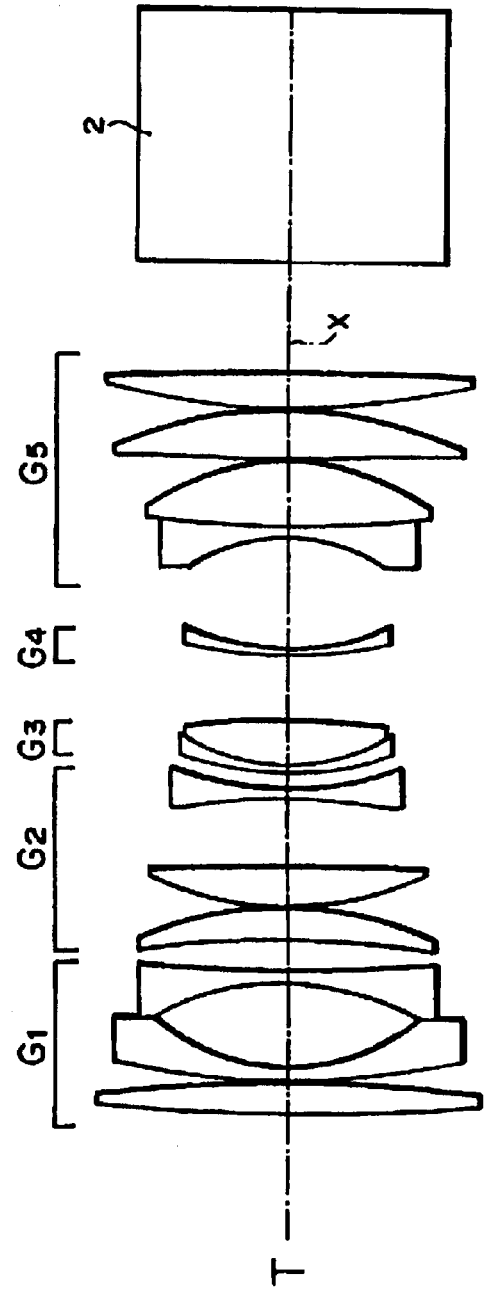
Fig. 1A
Fig. 1B

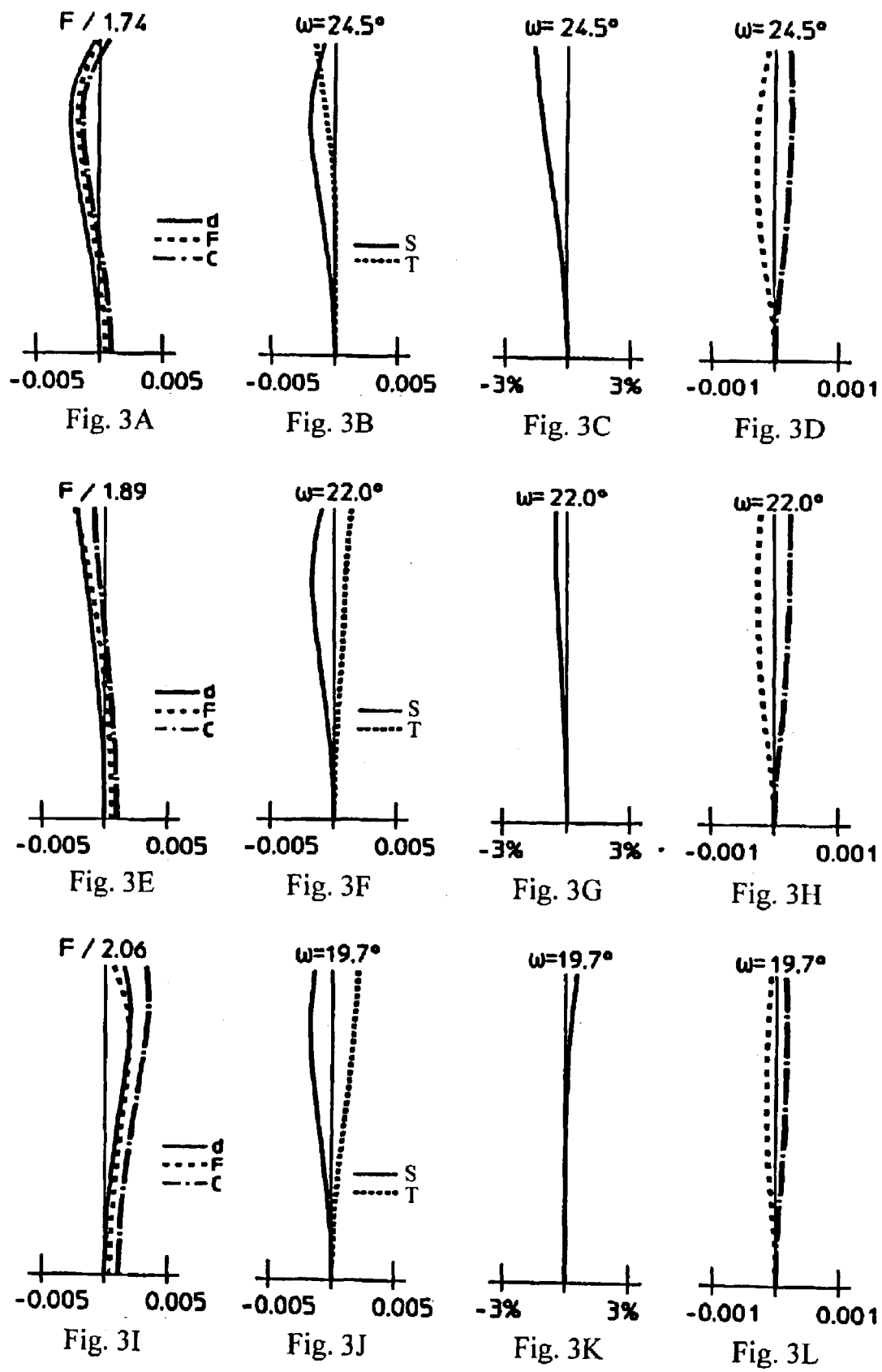

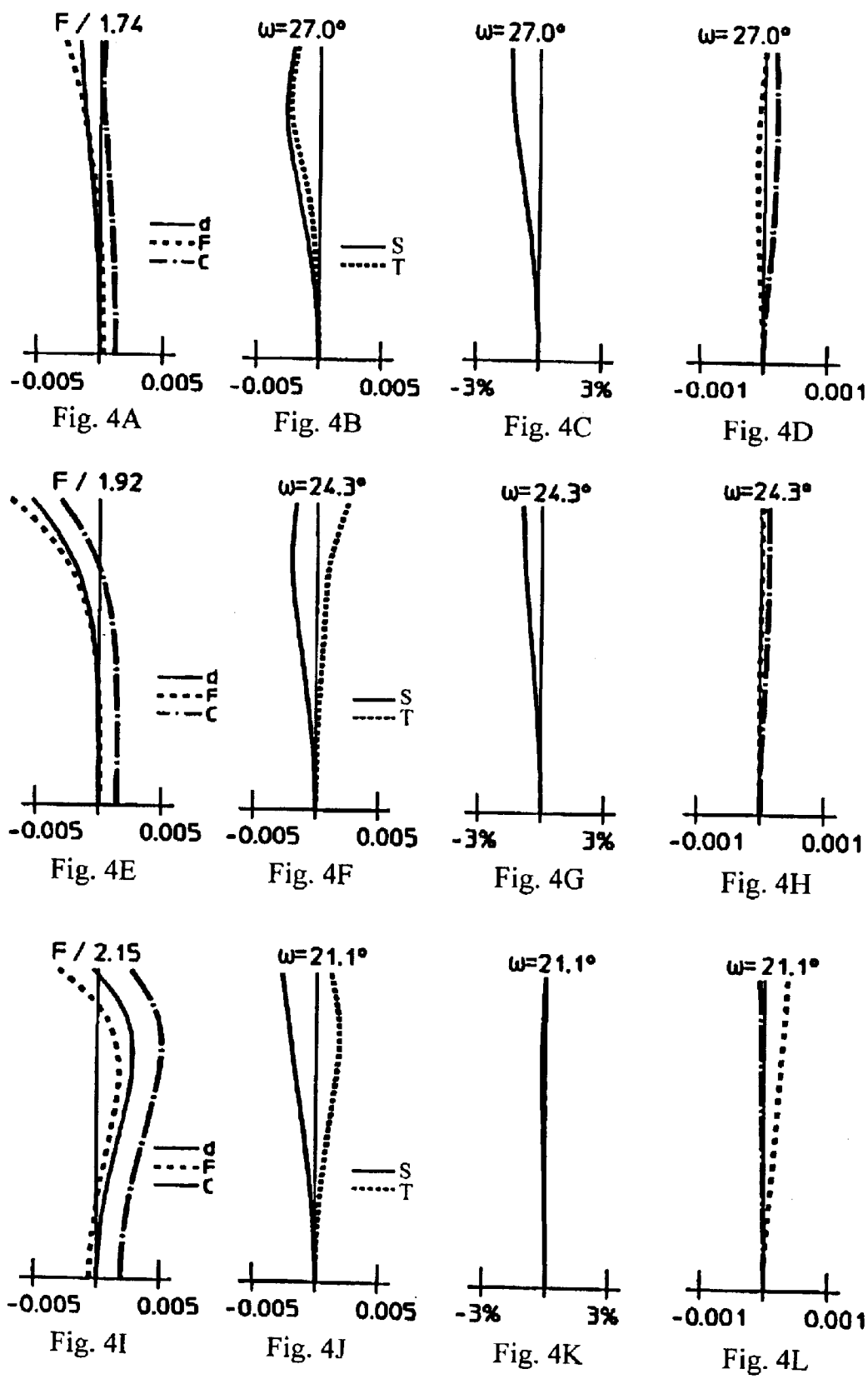

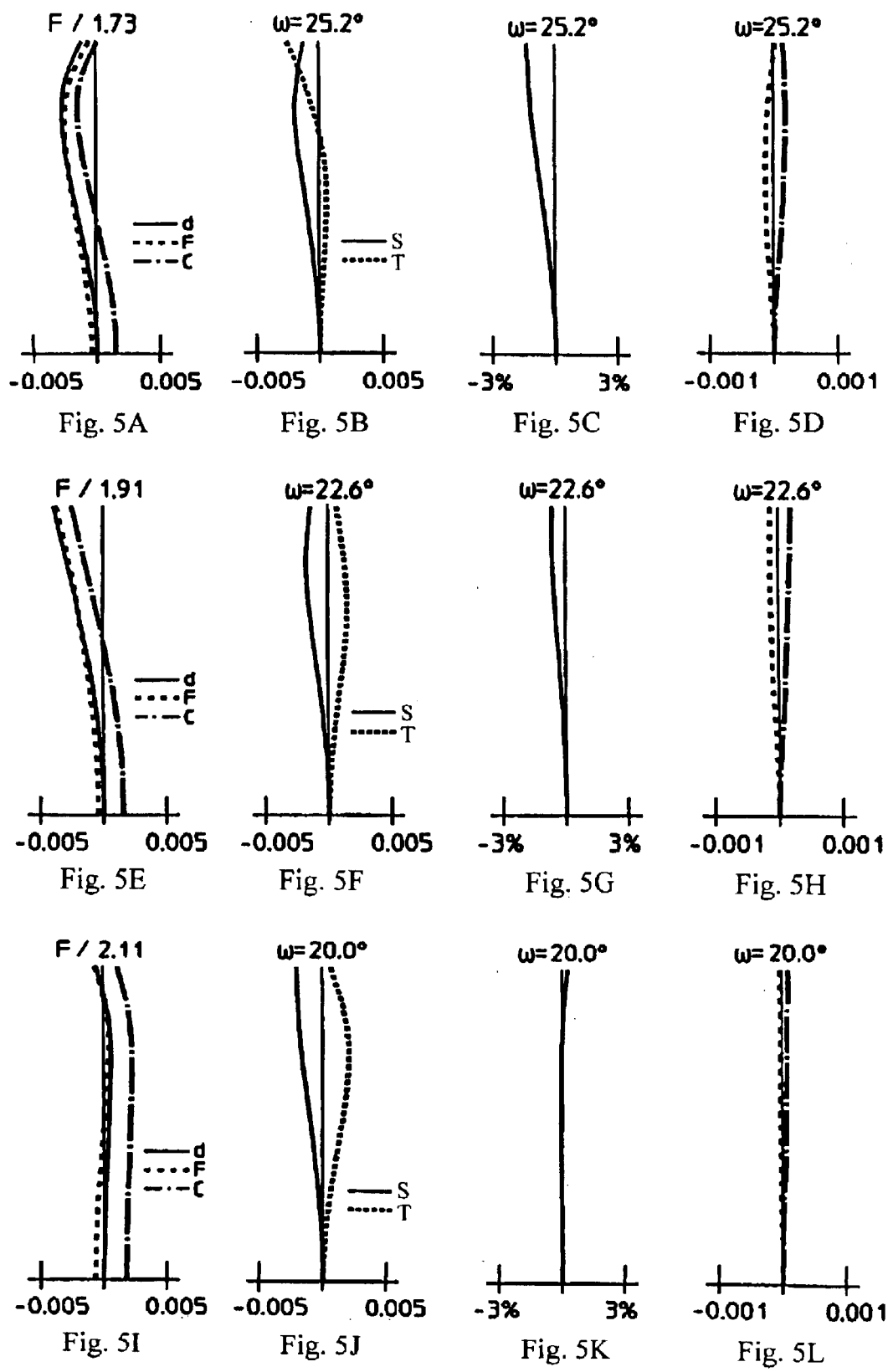

FIVE-GROUP ZOOM LENS AND PROJECTION DISPLAY DEVICE INCLUDING IT

BACKGROUND OF THE INVENTION

Five-group zoom lenses are described, for example, in Japanese Laid-Open Patent Applications H10-268193, 2000-292701, and 2001-4919. These publications disclose arrangements of zoom lenses with five lens groups, including a negative lens group that is the first lens group from the enlarging side of the zoom lens. This negative first lens group moves along the optical axis for focusing and is stationary during zooming. These zoom lenses further include, from the enlarging side, a positive second lens group, a positive third lens group, and a negative fourth lens group that are moved along the optical axis relative to the negative first lens group and relative to one another to provide continuous zooming and correction for shift of the image plane caused by the continuous zooming. These zoom lenses also include a fifth lens group from the enlarging side that is a positive lens group and that is stationary during zooming. These zoom lenses satisfy various conditions.

Zoom lenses are demanded that provide a bright image in a liquid crystal projector and that are compact when used in such a projector. Recently, in addition to these requirements, there is a demand that the projection distance be short so that a zoom projection lens with a wider field angle is needed. Additionally, the zoom lenses for liquid crystal projectors need to be telecentric, or nearly telecentric, on the reducing side and have a large enough back focus to provide room for a color synthesizing system between the zoom lens and the plane of the liquid crystal display. Similar considerations apply when such a zoom lens is used in a camera using an image detecting element, such as a charge coupled device (CCD) or an image pickup tube, that uses a color separation system.

The above mentioned Japanese publications satisfy these demands to some extent, but they do not fully satisfy all the demands. For example, the zoom lenses described in Japanese Laid-Open Patent Application H10-268193 have been considered as achieving compactness with the desired image reduction on the reducing side, a proper back focus amount, and a roughly telecentric property on the reducing side. However, the f-number is about 2.5. Favorable correction of aberrations is possible with that f-number, but becomes problematic if the f-number of the zoom lens is reduced.

Zoom lenses as described in Japanese Laid-Open Patent Application 2000-292701 have small f-numbers so as to provide a bright image, but a high zoom ratio of these zoom lenses has not been achieved. Additionally, the negative refractive power of the focusing lens group is strong, which makes the diameter of the second lens group increase, as well as tends to make the diameters of the other moving lens groups increase, thereby making it difficult to make the zoom lens compact.

Zoom lenses as described in Japanese Laid-Open Patent Application 2001-4919 achieve a bright image at the wide-angle end, but it is hard to obtain a bright image at the telephoto end. Additionally, the refractive power of the fifth lens group from the enlarging side is small, which tends to increase the length of the zoom lens. If the length of the zoom lens is made to be shorter, the refractive powers of the first four lens groups from the enlarging side become so strong that a sufficient back focus is not obtained.

Therefore, in general, the prior art shows that it is not easy to design a zoom lens that satisfies the above requirements and provides a bright image (small f-number), a wide field angle, and a large zoom ratio while also maintaining compactness.

BRIEF SUMMARY OF THE INVENTION

The present invention relates to a zoom lens that favorably corrects aberrations, provides a bright image, has a wide field angle and a large zoom ratio. The invention further relates to a zoom lens for a liquid crystal projection display device or to a zoom lens for a camera using an image detecting element, such as a CCD, an image pickup tube, or photographic film.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 1A–1B show cross-sectional views of Embodiment 1 of the present invention at the wide-angle end and at the telephoto end, respectively;

FIGS. 3A–3D show the spherical aberration, astigmatism, distortion, and lateral color, respectively, of the zoom lens according to Embodiment 1 at the wide-angle end;

FIGS. 3E–3H show the spherical aberration, astigmatism, distortion, and lateral color, respectively, of the zoom lens according to Embodiment 1 at an intermediate position;

FIGS. 3I–3L show the spherical aberration, astigmatism, distortion, and lateral color, respectively, of the zoom lens according to Embodiment 1 at the telephoto end;

FIGS. 4A–4D show the spherical aberration, astigmatism, distortion, and lateral color, respectively, of the zoom lens according to Embodiment 2 at the wide-angle end;

FIGS. 4E–4H show the spherical aberration, astigmatism, distortion, and lateral color, respectively, of the zoom lens according to Embodiment 2 at an intermediate position;

FIGS. 4I–4L show the spherical aberration, astigmatism, distortion, and lateral color, respectively of the zoom lens according to Embodiment 2 at the telephoto end;

FIGS. 5A–5D show the spherical aberration, astigmatism, distortion, and lateral color, respectively, of the zoom lens according to Embodiment 3 at the wide-angle end;

FIGS. 5E–5H show the spherical aberration, astigmatism, distortion, and lateral color, respectively, of the zoom lens according to Embodiment 3 at an intermediate position; and FIGS. 5I–5L show the spherical aberration, astigmatism, distortion, and lateral color, respectively, of the zoom lens according to Embodiment 3 at the telephoto end.

DETAILED DESCRIPTION

Figure 2:
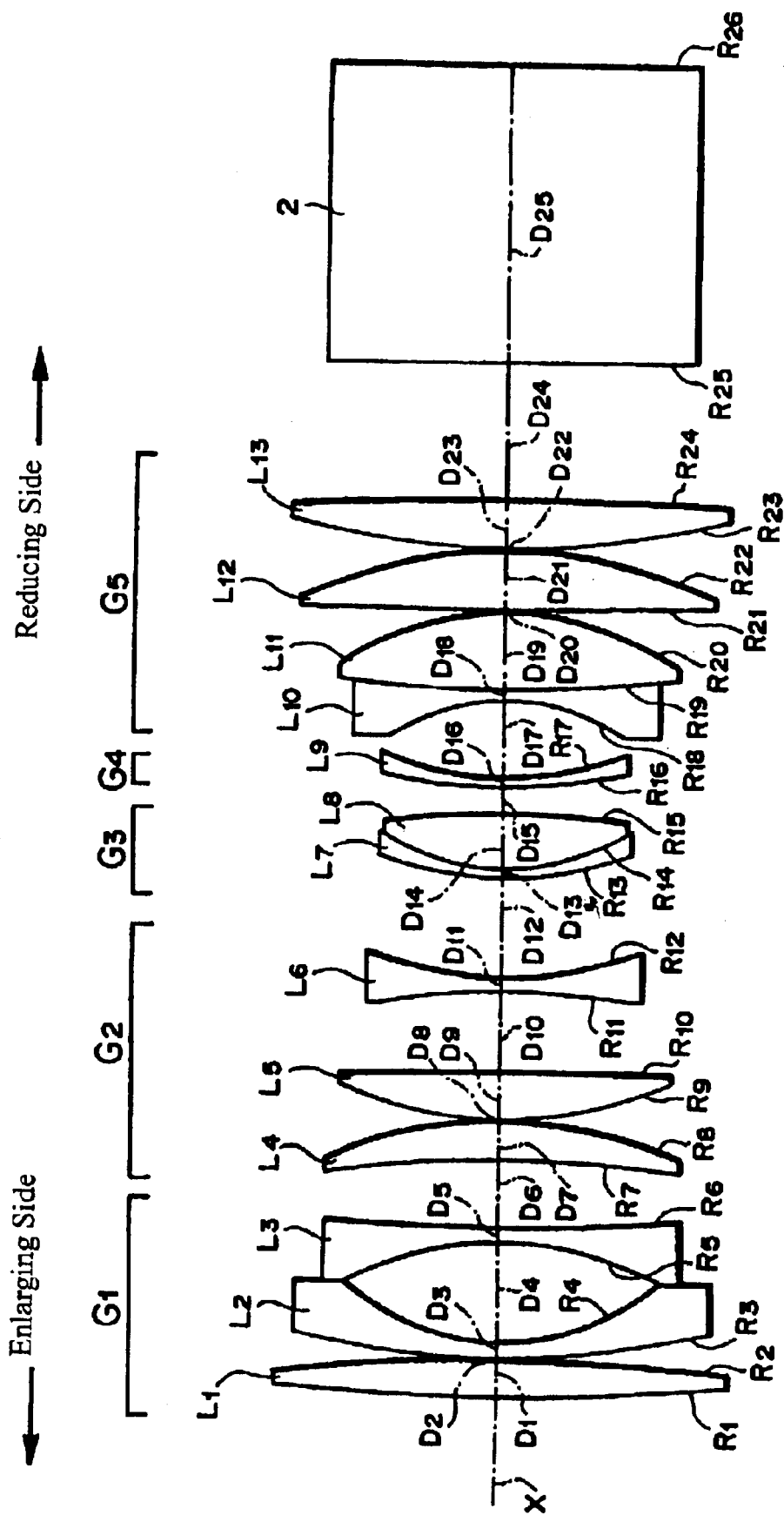
FIG. 2 shows a detailed cross-sectional view of Embodiment 1 of the zoom lens of the present invention at the wide-angle end.

First, definitions of the terms "lens element," "lens component," and "lens group," that relate to the following detailed description will be given. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Additionally, as used herein, the term "negative" preceding a lens element, lens component, or lens group means that the lens element, lens component, or lens group (as a whole) has a negative refractive power. Similarly, as used herein, the term "positive" preceding a lens element, lens component, or lens group means that the lens element, lens component, or lens group (as a whole) has a positive refractive power.

A general description of the preferred embodiments of the zoom lens of the present invention will now be described with reference to FIGS. 1A–1B and FIG. 2. FIGS. 1A–1B show cross-sectional views of Embodiment 1 of the present invention at the wide-angle end (W) and at the telephoto end (T), respectively. FIG. 2 shows a detailed cross-sectional view of Embodiment 1 of the zoom lens of the present invention at the wide-angle end. In FIGS. 1A–1B and FIG. 2, lens groups are referenced by the letter G followed by a number denoting their order from the enlarging side of the zoom lens, from $G_1$ to $G_5$. In FIG. 2, lens elements are referenced by the letter L followed by a number denoting their order from the enlarging side of the zoom lens, from $L_1$ to $L_{13}$. Similarly, the radii of curvature of the optical surfaces of all the optical elements, including the lens surfaces and one or more optical elements represented as a glass block 2 that may be a color synthesizing or color separating optical system, such as a prism system, alone or with a low-pass filter, are referenced by the letter R followed by a number denoting their order from the enlarging side of the zoom lens, from $R_1$ to $R_{26}$. An imaging plane (not shown) is on the image side of the glass block 2. The on-axis surface spacings along the optical axis X of all the optical element surfaces are referenced by the letter D followed by a number denoting their order from the enlarging side of the zoom lens, from $D_1$ to $D_{26}$.

With regard to the definitions of "lens component," and "lens element" above, in the three preferred embodiments of the zoom lens of the present invention described below, the present invention may variously be described in terms of lens elements or in terms of lens components. The use of these terms in describing preferred embodiments of the invention should not be taken to limit the scope of the invention to these preferred embodiments. For example, if certain conditions satisfied by the preferred embodiments of the invention are described in terms of features of lens elements that are also lens components, the conditions may also be described in terms of lens components as appropriate. One skilled in the art will recognize from the descriptions that follow when lens elements are also lens components and when lens components include more than one lens element based on the definitions of the terms "lens element" and "lens component" above.

As shown in FIG. 2, the zoom lens includes, from the enlarging side, a negative first lens group $G_1$ that is movable for focusing and that remains stationary during zooming, a positive second lens group $G_2$, a positive third lens group $G_3$, a negative fourth lens group $G_4$, and a positive fifth lens group $G_5$ that remains stationary during zooming. The second lens group $G_2$, the third lens group $G_3$, and the fourth lens group $G_4$ are movable relative to one another and relative to the first lens group $G_5$ and the fifth lens group $G_5$. The optical elements represented by glass block 2 remain stationary during zooming.

The second lens group $G_2$ contains at least one negative lens component, which is the sixth lens element from the enlarging side, i.e., lens element $L_6$, as shown in FIG. 2. Lens element $L_6$ is on the reducing side of the second lens group $G_2$ and includes a concave lens surface on the reducing side.

As stated previously, the first lens group $G_1$ is movable for focusing and is stationary during zooming. The second, third and fourth lens groups $G_2$, $G_3$, and $G_4$, respectively, move to provide continuous zooming and to correct for the image plane shift caused by the continuous zooming. The fifth lens group $G_5$ is a relay lens that is stationary during zooming. The zoom lens is so constructed that the spacing between the second lens group $G_2$ and the third lens group $G_3$ is reduced as the zoom lens zooms toward the telephoto end.

In a projection display device using a zoom lens related to the present invention, the projection display device includes a light source, an image source and the zoom lens of the present invention. In this device, the zoom lens related to the present invention functions as a projection lens for projecting an optical image on a screen from light modulated by the image source. For example, in a liquid crystal video projector equipped with the zoom lens shown in FIG. 1A, a roughly collimated light beam incident from a light source (not shown) on the right side of FIG. 1A is modulated with image information by passing through a liquid crystal display panel (not shown) before traveling through the representative glass block 2 and the zoom lens in order to provide an enlarged image on a screen (not shown) positioned to the left side of FIG. 1A. Generally, the liquid crystal video projector is so constructed that a beam from the light source is separated into three primary colors of R, G, B by a color separation system that includes a dichroic reflective optical system, a lens array, and three liquid crystal display panels for the three primary colors in order to display a full color picture. In particular, the representative glass block 2 may be a dichroic prism system for synthesizing light beams of three primary colors that have been modulated by the three liquid crystal display panels.

The operation and effects of a zoom lens related to the present invention and a projection display device will be described below. First, fluctuations in aberrations due to zooming are reduced by using, in order from the enlarging side, a first lens group that does not move for zooming followed by three lens groups that are moved for zooming and for the correction of what would otherwise be a shifting in the image plane during zooming. The three lens groups that are moved are, in order from the enlarging side of the zoom lens, a positive second lens group $G_2$, a positive third lens group $G_3$, and a negative fourth lens group $G_4$. Additionally, the moving distance of the three lens groups may be made small and the zoom lens made compact, while still securing a prescribed zoom ratio and while favorably correcting aberrations, as a result of the second lens group $G_2$ including a negative lens component and the zoom lens satisfying Conditions (1)–(4) that will be described later. Also, according to the present invention, a negative lens component that is positioned at the reducing side of the second lens group $G_2$ has its surface on the reducing side concave, and this is very effective for favorable correction of lateral color.

Preferably, the following condition is satisfied:

$$-1.2 < f1/f < -0.9 \qquad \text{Condition (1)}$$

where f1 is the focal length of the first lens group, and f is the focal length of the zoom lens at the wide-angle end, i.e., the conjugate position on the magnifying side is at infinity.

If the above ratio of focal lengths of Condition (1) is smaller than the lower limit, the negative power of the first lens group $G_1$ is reduced, which makes the correction of aberrations at a small f-number difficult, increases the amount of movement of the first lens group $G_1$ required for focusing, and makes fluctuations in aberrations excessive. On the other hand, if the above ratio of focal lengths of Condition (1) is larger than the upper limit of Condition (1), the negative power of the first lens group is increased so that axial light is diverged from the optical axis so much that correction of various aberrations, including distortion and spherical aberration, becomes difficult.

Additionally, preferably the following condition is satisfied:

$$0.9 < f2/f < 1.5 \qquad \text{Condition (2)}$$

where f2 is the focal length of the second lens group, and f is as defined above.

If the above ratio of focal lengths of Condition (2) is larger than the upper limit of Condition (2), the positive power of the second lens group $G_2$ is reduced, which results in both large movements during zooming of the lens groups that move for zooming and a large overall length of the zoom lens. On the other hand, if the above ratio of focal lengths of Condition (2) is smaller than the lower limit of Condition (2), the positive power of the second lens group $G_2$ is increased so that correction of aberrations is difficult.

Further, preferably the following condition is satisfied:

$$1.0 < f3/f < 1.5 \qquad \text{Condition (3)}$$

where f3 is the focal length of the third lens group, and f is as defined above.

Condition (3) specifies the positive refractive power of third lens group $G_3$ and is interrelated to Conditions (1) and (2) discussed previously and Condition (4) that will be discussed later. Conditions (1)–(4) operate together to balance the powers of the lens groups, to correct aberrations, and to properly balance the properties of image brightness, zoom lens compactness, width of field angle, and the magnitude of the zoom ratio by specifying the positive power of third lens group $G_3$ so as to satisfy Condition (3), and by specifying the powers of the lens groups $G_1$, $G_2$ and $G_5$ so as to satisfy Conditions (1), (2) and (4), respectively.

With regard to Condition (3), to secure good telecentricity on the reducing side of the zoom lens, it is desirable that settings involved in the image brightness of the zoom lens, such as a restriction of the lens diameter or an arrangement of a stop, are carried out in the third lens group $G_3$ rather than the other lens groups. However, the third lens group $G_3$ moves at the time of zooming. If the above ratio of focal lengths of Condition (3) is larger than the upper limit, the positive refractive power of the third lens group $G_3$ is reduced, which results in increasing the movement of the third lens group $G_3$ with zooming. If the amount of movement of the third lens group $G_3$ during zooming increases, the maximum f-number at the telephoto and wide-angle ends varies greatly and the overall length of the zoom lens increases. On the other hand, if the above ratio of focal lengths of Condition (3) is smaller than the lower limit of Condition (3), the positive power of the third lens group $G_3$ tends to increase so that aberrations generated by this moving third lens group $G_3$ increase so much that correction of aberrations is difficult.

Additionally, preferably the following condition is satisfied:

$$1.0 < f5/f < 1.5 \qquad \text{Condition (4)}$$

where f5 is the focal length of the fifth lens group, and f is as defined above.

If the lower limit of Condition (4) is not satisfied, the positive refractive power of the fifth lens group $G_5$ is increased so that the back focus is shortened and it becomes difficult to provide rays on the reducing side that are in a telecentric state. On the other hand, if the upper limit of Condition (4) is not satisfied, the positive power of the fifth lens group $G_5$ is reduced to the point that the back focus becomes excessive and the size of the zoom lens increases. Moreover, the height of an axial ray at the fifth lens group becomes inadequate to favorably correct aberrations.

As discussed above, a zoom lens related to the present invention is preferably constructed so that at least a single lens component of the second lens group $G_2$ is a negative lens component with a concave lens surface on the reducing side. The negative lens component may be formed either as a single lens element or as two or more lens elements. For example, the negative lens component may be a doublet formed of two lens elements held together in intimate overall contact by a transparent optical adhesive. More preferably, the negative lens component is the lens component of the second lens group $G_2$ on the reducing side. Still more preferably, the following condition is satisfied:

$$\nu_n > 60 \qquad \text{Condition (5)}$$

where $\nu_n$ is the Abbe number, at the d-line, of the lens element having negative refractive power that is positioned on the reducing side of the second lens group.

If Condition (5) is not satisfied, the correction of lateral color becomes difficult.

Additionally, preferably the following condition is satisfied:

$$0.2 < Dmax/f < 0.4 \qquad \text{Condition (6)}$$

where

Dmax is the largest spacing along the optical axis between lens elements of the second lens group $G_2$, and f is as defined above.

If the lower limit of Condition (6) is not satisfied, the correction of lateral color becomes particularly difficult. If the upper limit of Condition (6) is not satisfied, the overall length of the zoom lens tends to increase.

A zoom lens that relates to the present invention as set forth above provides favorable correction of aberrations, an appropriate back focus, an approximately telecentric property on the reducing side with a good balance of brightness of the image, compactness of the zoom lens as a whole, a wide field angle, and a high zoom ratio. When such a zoom lens is used in a projection display device, the appropriate back focus is large enough to provide room for a color synthesizing optical system in the position of representative glass block 2, as shown in FIG. 1A, the zoom lens is compact and provides a relatively wide-angle projection so as to illuminate a relatively large screen at a short distance.

Three preferred embodiments of the zoom lens of the present invention will now be individually described with reference to the drawings.

Embodiment 1

FIG. 2 shows the basic lens element configuration of a zoom lens according to Embodiment 1 of the present invention. As shown in FIG. 2, a first lens group $G_1$ includes, in order from the enlarging side, a biconvex first lens element $L_1$ with its lens surface of greater curvature on the reducing side, a negative meniscus second lens element $L_2$ with its convex lens surface on the enlarging side, and a biconcave third lens element $L_3$ with its lens surface of greater curvature on the enlarging side of the zoom lens.

A second lens group $G_2$ includes, in order from the enlarging side, a positive meniscus fourth lens element $L_4$ with its convex surface on the reducing side, a biconvex fifth lens element $L_5$ with its lens surface of greater curvature on the enlarging side, and a biconcave sixth lens element $L_6$ with its lens surface of greater curvature on the reducing side. A third lens group $G_3$ includes, in order from the enlarging side, a negative meniscus seventh lens element $L_7$ with its convex lens surface on the enlarging side, and a biconvex eighth lens element $L_8$ with its lens surface of greater curvature on the enlarging side of the zoom lens.

A fourth lens group $G_4$ includes, in order form the enlarging side, a meniscus ninth lens element $L_9$ with its convex lens surface on the enlarging side. A fifth lens group $G_5$ includes, from the enlarging side, a negative biconcave tenth lens element $L_{10}$ with its lens surface of smaller curvature on the reducing side cemented to a biconvex eleventh lens element $L_{11}$ with its lens surface of greater curvature on the reducing side, a biconvex twelfth lens element $L_{12}$ with its lens surface of greater curvature on the reducing side, and a biconvex thirteenth lens element $L_{13}$ with its lens surface of greater curvature on the enlarging side of the zoom lens.

Table 1 below lists the surface number #, in order from the enlarging side, the radius of curvature R (in mm) of each surface, the on-axis surface spacing D (in mm) between surfaces, as well as the refractive index $N_d$ and the Abbe number $v_d$ (both at the d-line of $\lambda$=587.6 nm) of each lens element of Embodiment 1. All values are normalized for a focal length of approximately unity at the wide-angle end, more specifically, in this embodiment the focal length at the wide-angle end equals 0.9954.

TABLE 1

| # | R | D | $N_d$ | $v_d$ |
|---|---|---|---|---|
| 1 | 6.663 | 0.118 | 1.77250 | 49.6 |
| 2 | −5.514 | 0.006 | | |
| 3 | 2.734 | 0.041 | 1.48749 | 70.2 |
| 4 | 0.688 | 0.305 | | |
| 5 | −0.953 | 0.040 | 1.64769 | 33.8 |
| 6 | 7.212 | $D_6$ (variable) | | |
| 7 | −3.600 | 0.121 | 1.80610 | 40.9 |
| 8 | −1.171 | 0.006 | | |
| 9 | 1.094 | 0.153 | 1.83481 | 42.7 |
| 10 | −11.515 | 0.239 | | |
| 11 | −2.208 | 0.037 | 1.48749 | 70.2 |
| 12 | 1.075 | $D_{12}$ (variable) | | |
| 13 | 1.005 | 0.026 | 1.83400 | 37.2 |
| 14 | 0.607 | 0.173 | 1.62041 | 60.3 |
| 15 | −2.285 | $D_{15}$ (variable) | | |
| 16 | 1.536 | 0.026 | 1.84666 | 23.8 |
| 17 | 0.855 | $D_{17}$ (variable) | | |
| 18 | −0.584 | 0.034 | 1.84666 | 23.8 |
| 19 | 3.613 | 0.242 | 1.60300 | 65.4 |
| 20 | −0.801 | 0.006 | | |
| 21 | 22.216 | 0.186 | 1.83481 | 42.7 |
| 22 | −1.360 | 0.006 | | |
| 23 | 2.345 | 0.146 | 1.84666 | 23.8 |
| 24 | −10.579 | 0.415 | | |
| 25 | ∞ | 0.901 | 1.51680 | 64.2 |
| 26 | ∞ | | | |

In the zoom lens of Embodiment 1, lens groups $G_2$, $G_3$, and $G_4$ move to vary their separation and the separations of lens group $G_2$ from lens group $G_1$ and lens group $G_4$ from lens group $G_5$. Therefore, the values of the on-axis spacings $D_6$, $D_{12}$, $D_{15}$, and $D_{17}$ vary. Table 2 below lists the values of the variables $D_6$, $D_{12}$, $D_{15}$, and $D_{17}$ (i.e., the on-axis spacings) at the wide-angle end (Wide), at an intermediate zoom position (Middle), and at the telephoto end (Tele) with the zoom lens set at an image reduction ratio of −0.014 at the wide-angle end.

TABLE 2

| Zoom Setting | Zoom Ratio | $D_6$ | $D_{12}$ | $D_{15}$ | $D_{17}$ |
|---|---|---|---|---|---|
| Wide | 1.00 | 0.208 | 0.303 | 0.082 | 0.245 |
| Middle | 1.12 | 0.154 | 0.190 | 0.168 | 0.327 |
| Tele | 1.25 | 0.112 | 0.065 | 0.250 | 0.413 |

The zoom lens of Embodiment 1 of the present invention satisfies all of Conditions (1) through (6) above as set forth in Table 3 below. The bottom portion of Table 3 recites, where necessary, the quantities that have been used to calculate the values that satisfy Conditions (1) through (6).

TABLE 3

| Condition No. | Condition | Value |
|---|---|---|
| (1) | −1.2 < f1 / f < −0.9 | −0.93 |
| (2) | 0.9 < f2 / f < 1.5 | 1.08 |
| (3) | 1.0 < f3 / f < 1.5 | 1.36 |
| (4) | 1.0 < f5 / f < 1.5 | 1.17 |
| (5) | $v_d$ > 60 | 70.2 |
| (6) | 0.2 < Dmax / f < 0.4 | 0.24 | f1 = −0.9276
f = 0.9954
f2 = 1.0804
f3 = 1.3579
f5 = 1.1720
Dmax = 0.239

FIGS. 3A–3D show the spherical aberration (in mm), astigmatism (in mm), distortion, and lateral color (in mm), respectively, for the zoom lens of Embodiment 1 at the wide-angle end, FIGS. 3E–3H show these same aberrations at an intermediate position, and FIGS. 3I–3L show these same aberrations at the telephoto end. In FIGS. 3A, 3E, and 3I, the spherical aberration at the d-line of λ=587.6 nm is shown by a solid line, at the F-line of λ=486.1 nm is shown by a dotted line, and at the C-line of λ=656.3 nm is shown by a dash-dot line. In FIGS. 3A, 3E, and 3I the f-number is indicated as being 1.74, 1.89 and 2.06, respectively. In FIGS. 3B, 3F, and 3J, the astigmatism is shown for both the sagittal image surface S and the tangential image surface T. FIGS. 3C, 3G, and 3K show distortion at the d-line. In FIGS. 3D, 3H, and 3L, lateral color at the F-line is shown by a dotted line and lateral color at the C-line is shown by a dash-dot line. In these figures ω is the half-image angle.

As is evident from FIGS. 3A–3L and Tables 1–3 above, the zoom lens of Embodiment 1 provides favorable correction of aberrations over the entire zoom range, achieves an appropriate back focus, provides approximate telecentricity on the reducing side, and achieves a good balance of image brightness, compactness, width of field angle, and magnitude of zoom ratio.

Embodiment 2

Embodiment 2 is very similar to Embodiment 1 and uses the same number of lens elements. Because Embodiment 2 is very similar to Embodiment 1, only the differences between Embodiment 2 and Embodiment 1 will be explained for Embodiment 2. In Embodiment 2, as in Embodiment 1, the first lens element $L_1$ from the enlarging side of the zoom lens is a biconvex lens element. However, in Embodiment 2, lens element $L_1$ has surfaces of different radii of curvature with the surface of smaller radius of curvature on the enlarging side of the zoom lens. Additionally, in Embodiment 2, the fifth lens element $L_5$ from the enlarging side of the zoom lens is a positive meniscus lens, rather than a biconvex lens element as in Embodiment 1, that has its convex lens surface on the enlarging side of the zoom lens.

Table 4 below lists the surface number #, in order from the enlarging side, the radius of curvature R (in mm) of each surface, the on-axis surface spacing D (in mm) between surfaces, as well as the refractive index $N_d$ and the Abbe number $v_d$ (both at the d-line of λ=587.6 nm) of each lens element of Embodiment 2. All values are normalized for a focal length of approximately unity at the wide-angle end, more specifically, in this embodiment the focal length at the wide-angle end equals 0.9975.

TABLE 4

| # | R | D | $N_d$ | $v_d$ |
|---|---|---|---|---|
| 1 | 2.255 | 0.255 | 1.51633 | 64.1 |
| 2 | -12.731 | 0.006 | | |
| 3 | 1.831 | 0.053 | 1.58913 | 61.1 |
| 4 | 0.740 | 0.350 | | |
| 5 | -1.515 | 0.046 | 1.72342 | 38.0 |
| 6 | 1.784 | $D_6$ (variable) | | |
| 7 | -4.838 | 0.148 | 1.88300 | 40.8 |
| 8 | -1.574 | 0.006 | | |
| 9 | 1.349 | 0.179 | 1.83481 | 42.7 |
| 10 | 30.617 | 0.307 | | |
| 11 | -10.274 | 0.042 | 1.48749 | 70.2 |
| 12 | 1.378 | $D_{12}$ (variable) | | |
| 13 | 1.236 | 0.031 | 1.83400 | 37.2 |
| 14 | 0.623 | 0.232 | 1.71300 | 53.9 |
| 15 | -3.246 | $D_{15}$ (variable) | | |

TABLE 4-continued

| # | R | D | $N_d$ | $v_d$ |
|---|---|---|---|---|
| 16 | 1.365 | 0.031 | 1.80518 | 25.4 |
| 17 | 0.832 | $D_{17}$ (variable) | | |
| 18 | -0.706 | 0.045 | 1.84666 | 23.8 |
| 19 | 2.437 | 0.261 | 1.60300 | 65.4 |
| 20 | -1.037 | 0.006 | | |
| 21 | 6.626 | 0.209 | 1.80400 | 46.6 |
| 22 | -1.686 | 0.006 | | |
| 23 | 2.398 | 0.185 | 1.84666 | 23.8 |
| 24 | -17.510 | 0.334 | | |
| 25 | ∞ | 1.047 | 1.51680 | 64.2 |
| 26 | ∞ | | | |

In the zoom lens of Embodiment 2, lens groups $G_2$, $G_3$, and $G_4$ move to vary their separation and the separations of lens group $G_2$ from lens group $G_1$ and lens group $G_4$ from lens group $G_5$. Therefore, the values of the on-axis spacings $D_6$, $D_{12}$, $D_{15}$, and $D_{17}$ vary. Table 5 below lists the values of the variables $D_6$, $D_{12}$, $D_{15}$, and $D_{17}$ (i.e., the on-axis spacings) at the wide-angle end (Wide), at an intermediate zoom position (Middle), and at the telephoto end (Tele) with the zoom lens set at an image reduction ratio of −0.010 at the wide-angle end.

TABLE 5

| Zoom Setting | Zoom Ratio | $D_6$ | $D_{12}$ | $D_{15}$ | $D_{17}$ |
|---|---|---|---|---|---|
| Wide | 1.00 | 0.469 | 0.386 | 0.147 | 0.306 |
| Middle | 1.12 | 0.398 | 0.266 | 0.213 | 0.432 |
| Tele | 1.30 | 0.331 | 0.072 | 0.278 | 0.626 |

The zoom lens of Embodiment 2 of the present invention satisfies all of Conditions (1) through (6) above as set forth in Table 6 below. The bottom portion of Table 6 recites, where necessary, the quantities that have been used to calculate the values that satisfy Conditions (1) through (6).

TABLE 6

| Condition No. | Condition | Value |
|---|---|---|
| (1) | −1.2 < f1 / f < −0.9 | −0.94 |
| (2) | 0.9 < f2 / f < 1.5 | 1.33 |
| (3) | 1.0 < f3 / f < 1.5 | 1.46 |
| (4) | 1.0 < f5 / f < 1.5 | 1.42 |
| (5) | $v_d$ > 60 | 70.2 |
| (6) | 0.2 < Dmax / f < 0.4 | 0.31 | f1 = −0.9408
f = 0.9975
f2 = 1.3282
f3 = 1.4587
f5 = 1.4204
Dmax = 0.307

FIGS. 4A–4D show the spherical aberration (in mm), astigmatism (in mm), distortion, and lateral color (in mm), respectively, for the zoom lens of Embodiment 2 at the wide-angle end, FIGS. 4E–4H show these same aberrations at an intermediate position, and FIGS. 4I–4L show these same aberrations at the telephoto end. In FIGS. 4A, 4E, and 4I, the spherical aberration at the d-line of λ=587.6 nm is shown by a solid line, at the F-line of λ=486.1 nm is shown by a dotted line, and at the C-line of λ=656.3 nm is shown by a dash-dot line. In FIGS. 4A, 4E, and 4I the f-number is indicated as being 1.74, 1.92 and 2.15, respectively. In FIGS. 4B, 4F, and 4J, the astigmatism is shown for both the sagittal image surface S and the tangential image surface T. FIGS. 4C, 4G, and 4K show distortion at the d-line. In FIGS. 4D, 4H, and 4L, lateral color at the F-line is shown by a dotted line and lateral color at the C-line is shown by a dash-dot line. In these figures ω is the half-image angle.

As is evident from FIGS. 4A–4L and Tables 4–6 above, the zoom lens of Embodiment 2 provides good correction of aberrations over the entire zoom range, achieves an appropriate back focus, provides approximate telecentricity on the reducing side, and achieves a good balance of image brightness, compactness, width of field angle, and magnitude of zoom ratio.

Embodiment 3

Embodiment 3 is very similar to Embodiment 2 and uses the same number of lens elements. Because Embodiment 3 is very similar to Embodiment 2, only the differences between Embodiment 3 and Embodiment 2 will be explained for Embodiment 3. In Embodiment 3, the twelfth lens element $L_{12}$ from the enlarging side of the zoom lens is a positive meniscus lens, rather than a biconvex lens element as in Embodiment 2, that has its convex lens surface on the reducing side.

Table 7 below lists the surface number #, in order from the enlarging side, the radius of curvature R (in mm) of each surface, the on-axis surface spacing D (in mm) between surfaces, as well as the refractive index $N_d$ and the Abbe number $v_d$ (both at the d-line of λ=587.6 nm) of each lens element of Embodiment 3. All values are normalized for a focal length of approximately unity at the wide-angle end, more specifically, in this embodiment the focal length at the wide-angle end equals 0.995.

TABLE 7

| # | R | D | $N_d$ | $v_d$ |
|---|---|---|---|---|
| 1 | 3.399 | 0.186 | 1.51633 | 64.1 |
| 2 | -5.426 | 0.005 | | |
| 3 | 2.393 | 0.047 | 1.49700 | 81.5 |
| 4 | 0.733 | 0.342 | | |
| 5 | -1.099 | 0.044 | 1.60562 | 43.7 |
| 6 | 3.001 | $D_6$ (variable) | | |
| 7 | -3.420 | 0.136 | 1.80400 | 46.6 |
| 8 | -1.247 | 0.006 | | |
| 9 | 1.237 | 0.147 | 1.83481 | 42.7 |
| 10 | 9.688 | 0.363 | | |
| 11 | -11.635 | 0.041 | 1.51633 | 64.1 |
| 12 | 1.609 | $D_{12}$ (variable) | | |
| 13 | 1.240 | 0.030 | 1.83400 | 37.2 |
| 14 | 0.612 | 0.187 | 1.71300 | 53.9 |
| 15 | -3.182 | $D_{15}$ (variable) | | |
| 16 | 2.545 | 0.030 | 1.78472 | 25.7 |
| 17 | 0.955 | $D_{17}$ (variable) | | |
| 18 | -0.604 | 0.037 | 1.84666 | 23.8 |
| 19 | 4.172 | 0.229 | 1.62041 | 60.3 |
| 20 | -0.854 | 0.005 | | |
| 21 | -253.248 | 0.183 | 1.80400 | 46.6 |
| 22 | -1.341 | 0.005 | | |
| 23 | 2.083 | 0.162 | 1.84666 | 23.8 |
| 24 | -11.052 | 0.383 | | |
| 25 | ∞ | 0.982 | 1.51680 | 64.2 |
| 26 | ∞ | | | |

In the zoom lens of Embodiment 3, lens groups $G_2$, $G_3$, and $G_4$ move to vary their separation and the separations of lens group $G_2$ from lens group $G_1$ and lens group $G_4$ from lens group $G_5$. Therefore, the values of the on-axis spacings $D_6$, $D_{12}$, $D_{15}$, and $D_{17}$ vary. Table 8 below lists the values of the variables $D_6$, $D_{12}$, $D_{15}$, and $D_{17}$ (i.e., the on-axis spacings) at the wide-angle end (Wide), at an intermediate zoom position (Middle), and at the telephoto end (Tele) with the zoom lens set at an image reduction ratio of –0.017 at the wide-angle end.

TABLE 8

| Zoom Setting | Zoom Ratio | $D_6$ | $D_{12}$ | $D_{15}$ | $D_{17}$ |
|---|---|---|---|---|---|
| Wide | 1.00 | 0.335 | 0.333 | 0.088 | 0.246 |
| Middle | 1.12 | 0.258 | 0.205 | 0.172 | 0.366 |
| Tele | 1.27 | 0.193 | 0.041 | 0.256 | 0.512 |

The zoom lens of Embodiment 3 of the present invention satisfies all of Conditions (1) through (6) above as set forth in Table 9 below. The bottom portion of Table 9 recites, where necessary, the quantities that have been used to calculate the values that satisfy Conditions (1) through (6).

TABLE 9

| Condition No. | Condition | Value |
|---|---|---|
| (1) | $-1.2 < f1 / f < -0.9$ | -1.01 |
| (2) | $0.9 < f2 / f < 1.5$ | 1.20 |
| (3) | $1.0 < f3 / f < 1.5$ | 1.46 |
| (4) | $1.0 < f5 / f < 1.5$ | 1.20 |
| (5) | $v_d > 60$ | 64.1 |
| (6) | $0.2 < Dmax / f < 0.4$ | 0.36 | f1 = -1.0092
f = 0.9955
f2 = 1.2009
f3 = 1.4556
f5 = 1.2038
Dmax = 0.363

FIGS. 5A–5D show the spherical aberration (in mm), astigmatism (in mm), distortion, and lateral color (in mm), respectively, for the zoom lens of Embodiment 3 at the wide-angle end, FIGS. 5E–5H show these same aberrations at an intermediate position, and FIGS. 5I–5L show these same aberrations at the telephoto end. In FIGS. 5A, 5E, and 5I, the spherical aberration at the d-line of λ=587.6 nm is shown by a solid line, at the F-line of λ=486.1 nm is shown by a dotted line, and at the C-line of λ=656.3 nm is shown by a dash-dot line. In FIGS. 5A, 5E, and 5I the f-number is indicated as being 1.73, 1.91 and 2.11, respectively. In FIGS. 5B, 5F, and 5J, the astigmatism is shown for both the sagittal image surface S and the tangential image surface T. FIGS. 5C, 5G, and 5K show distortion at the d-line. In FIGS. 5D, 5H, and 5L, lateral color at the F-line is shown by a dotted line and lateral color at the C-line is shown by a dash-dot line. In these figures w is the half-image angle.

As is evident from FIGS. 5A–5L and Tables 7–9 above, the zoom lens of Embodiment 3 provides favorable correction of aberrations over the entire zoom range, achieves an appropriate back focus, provides approximate telecentricity on the reducing side, and achieves a good balance of image brightness, compactness, width of field angle, and magnitude of zoom ratio.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the preferred embodiments of the present invention, as other values can be adopted. Also, although all lens elements of the preferred embodiments are lens components, the lens components might include more than a single lens element. For example, as discussed previously with regard to Condition (5), the negative sixth lens element $L_6$ of the second lens group $G_2$ that is also a negative lens component may be replaced by a negative lens component made of two or more lens elements. Such a negative doublet component made of two or more lens elements may assist in correcting lateral color.

Additionally, a zoom lens of the present invention may be used as a projection lens in a projection display device using various image sources, including a transmissive liquid crystal display panel, a reflective liquid crystal display panel, or other light modulating image sources, such as a digital micromirror device (DMD). In such projection display devices, the image source modulates the light from the light source and the zoom lens focuses the modulated light to form a real image of an object represented by the image source. Furthermore, a zoom lens of the present invention may be used as an image forming lens for an image detecting device, such as a CCD or an image pickup tube, or with other imaging devices, such as a photographic camera using a zoom lens related to the present invention.

Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens formed of only five lens groups, in order from the enlarging side, as follows:
   a negative first lens group that is movable for focusing and that is stationary during zooming;
   a positive second lens group;
   a positive third lens group;
   a negative fourth lens group;
   a positive fifth lens group that is stationary during zooming;
   wherein
   said positive second lens group includes a negative lens component;
   said positive second lens group, said positive third lens group, and said negative fourth lens group move relative to one another and relative to said negative first lens group and said positive fifth lens group during zooming; and
   the follow conditions are satisfied:

$-1.2 < f1/f < -0.9$ $0.9 < f2/f < 1.5$ $1.0 < f3/f < 1.5$ $1.0 < f5/f < 1.5$ where
   f1 is the focal length of said first lens group;
   f is the focal length of the zoom lens at the wide-angle end;
   f2 is the focal length of said second lens group;
   f3 is the focal length of said third lens group; and
   f5 is the focal length of said fifth lens group.

2. The zoom lens of claim 1, wherein the spacing along the optical axis of the zoom lens between said second lens group and said third lens group is reduced as the zoom lens zooms toward the telephoto end.
toward the telephoto end.

3. The zoom lens of claim 1, wherein the lens surface of said negative lens component nearest the reducing side of the zoom lens is concave.

4. The zoom lens of claim 2, wherein the lens surface of said negative lens component nearest the reducing side of the zoom lens is concave.

5. The zoom lens of claim 3, wherein said negative lens component is positioned at the reducing side of the zoom lens from said positive second lens group.

6. The zoom lens of claim 4, wherein said negative lens component is positioned at the reducing side of the zoom lens from said positive second lens group.

7. The zoom lens of claim 5, wherein said negative lens component includes a negative lens element that satisfies the following condition:

$v_n > 60$ where
   $v_n$ is the Abbe number at the d-line of $\lambda = 587.6$ nm of the lens material of said negative lens element.

8. The zoom lens of claim 6, wherein said negative lens component includes a negative lens element that satisfies the following condition:

$v_n > 60$ where
   $v_n$ is the Abbe number at the d-line of $\lambda = 587.6$ nm of the lens material of said negative lens element.

9. The zoom lens of claim 1, wherein the following condition is satisfied:

$0.2 < Dmax/f < 0.4$ where
   Dmax is the maximum spacing along the optical axis between lens components of said positive second lens group, and
   f is the focal length of the zoom lens at the wide-angle end.

10. The zoom lens of claim 2, wherein the following condition is satisfied:

$0.2 < Dmax/f < 0.4$ where
    Dmax is the maximum spacing along the optical axis between lens components of said positive second lens group, and
    f is the focal length of the zoom lens at the wide-angle end.

11. The zoom lens of claim 3, wherein the following condition is satisfied:

$0.2 < Dmax/f < 0.4$ where
    Dmax is the maximum spacing along the optical axis between lens components of said positive second lens group, and
    f is the focal length of the zoom lens at the wide-angle end.

12. The zoom lens of claim 4, wherein the following condition is satisfied:

$0.2 < Dmax/f < 0.4$ where
    Dmax is the maximum spacing along the optical axis between lens components of said positive second lens group, and
    f is the focal length of the zoom lens at the wide-angle end.

13. The zoom lens of claim 5, wherein the following condition is satisfied:

$$0.2 < Dmax/f < 0.4$$

where

Dmax is the maximum spacing along the optical axis between lens components of said positive second lens group, and f is the focal length of the zoom lens at the wide-angle end.

14. The zoom lens of claim 6, wherein the following condition is satisfied:

$$0.2 < Dmax/f < 0.4$$

where

Dmax is the maximum spacing along the optical axis between lens components of said positive second lens group, and f is the focal length of the zoom lens at the wide-angle end.

15. The zoom lens of claim 7, wherein the following condition is satisfied:

$$0.2 < Dmax/f < 0.4$$

where

Dmax is the maximum spacing along the optical axis between lens components of said positive second lens group, and f is the focal length of the zoom lens at the wide-angle end.

16. The zoom lens of claim 8, wherein the following condition is satisfied:

$$0.2 < Dmax/f < 0.4$$

where

Dmax is the maximum spacing along the optical axis between lens components of said positive second lens group, and f is the focal length of the zoom lens at the wide-angle end.

17. A projection display device comprising:

the zoom lens of claim 1;

an image source; and a light source;

wherein the image source modulates the light from the light source and the zoom lens focuses the modulated light so as to form a real image of an object represented by the image source.

18. A projection display device comprising:

the zoom lens of claim 2;

an image source; and a light source;

wherein the image source modulates the light from the light source and the zoom lens focuses the modulated light so as to form a real image of an object represented by the image source.

19. A projection display device comprising:

the zoom lens of claim 3;

an image source; and a light source;

wherein the image source modulates the light from the light source and the zoom lens focuses the modulated light to form a real image of an object represented by the image source.

20. A projection display device comprising:

the zoom lens of claim 4;

an image source; and a light source;

wherein the image source modulates the light from the light source and the zoom lens focuses the modulated light to form a real image of an object represented by the image source.

* * * * *

UNITED STATES PATENT AND TRADEMARK OFFICE
CERTIFICATE OF CORRECTION

PATENT NO.    : 6,768,595 B2
DATED         : July 27, 2004
INVENTOR(S)   : Nagahara It is certified that error appears in the above-identified patent and that said Letters Patent is hereby corrected as shown below:

Column 13,
Line 61, delete "toward the telephoto end.".

Signed and Sealed this

Thirtieth Day of November, 2004

JON W. DUDAS
*Director of the United States Patent and Trademark Office*